May 26, 1964

P. R. MILLER 3,134,145

APPARATUS FOR FORMING FIBROUS BLANKETS

Filed Jan. 26, 1962

INVENTOR.
PAUL R. MILLER
BY
*Stachin & Overman*
ATTORNEYS

May 26, 1964

P. R. MILLER 3,134,145

APPARATUS FOR FORMING FIBROUS BLANKETS

Filed Jan. 26, 1962

INVENTOR.
PAUL R. MILLER
BY
ATTORNEYS

United States Patent Office 3,134,145
Patented May 26, 1964

3,134,145
APPARATUS FOR FORMING FIBROUS
BLANKETS
Paul R. Miller, Kansas City, Mo., assignor to Owens-Corning Fiberglas Corporation, a corporation of Delaware
Filed Jan. 26, 1962, Ser. No. 168,983
2 Claims. (Cl. 19—155)

This invention relates to the art of forming fibrous blankets such as those employed for insulation in residential and commercial construction, for thermal insulation in appliances such as refrigerators, and which may be densified by subsequent treatment for the production of densified fibrous boards, such as glass fiber board, used for the fabrication of acoustical tile or sound absorbing panels or for other thermal and acoustical insulation materials.

The invention particularly relates to a system for forming a fibrous blanket from continuously produced webs or veils of fine fibers such as those discharged by a rotary fiber forming apparatus and to the accumulation of such fibers as discharged from the fiber forming machines in a thick blanket of fibers by the overlapping or piling up of the fibrous webs or veils upon themselves on a continuously moving conveyor in order to produce a blanket of greater thickness or thus a final product of greater apparent density, with more nearly uniform distribution of the fibers and more nearly uniform thermal and acoustical insulating properties.

The invention finds particular utility and will be illustrated in connection with the accumulation of a very thick blanket of very fine continuously produced glass fibers which are discharged from rotary fiber forming apparatuses, for example apparatuses operating in accordance with the teachings of Kleist et al. U.S. Patent No. 2,949,632. An apparatus of this type produces a high quantity of very fine glass fibers having diameters in the order of say .00025 inch, and discharges the fibers in the form of a downwardly moving, hollow veil which is usually accumulated by depositing the veil upon a foraminous conveyor moving along beneath the apparatus. Because of limitations in the size of a fiber forming centrifuge which can be safely rotated at the high speeds necessary to produce the fibers, such a veil has a diameter of probably not more than, say, 18 inches and it is frequently desirable to produce a blanket of fibers having a transverse width of as much as 3, 4 or 5 feet.

It has been suggested, for example in Snow et al. Patent No. 2,863,493 that such a downwardly moving veil of fibers can be lapped back and forth transversely to the direction of movement of the conveyor upon which it is collected by the use of alternately actuated steam jets or directing blasts positioned at opposite sides of the fiber producing apparatus and alternately actuated in order to first blow the descending veil to one side of the conveyor and then back to the other side of the conveyor. By thus transversely lapping the descending veils of fibers of a plurality of fiber forming apparatuses which are arranged in a row parallel to the direction of movement of the conveyor, a plurality of transversely lapped fibrous veils may be accumulated upon a single conveyor, building up upon the conveyor in a shingled, gradually increasing blanket.

One disadvantage resulting from the use of alternating gaseous jets, for example steam jets, to alternately deflect the descending veil back and forth across the conveyor is the fact that the force of the jet of gas may cause some disruption of the descending veil of fibers which is extremely light in weight so that clumps, or plumes of the descending fibers may be blown out of a veil and later deposited elsewhere to result in definite points of non-uniformity in the blanket accumulating upon the conveyor.

A second and very serious disadvantage inherent in the use of jets of steam or other gas for lapping the veils is, of course, the high cost of the air or steam under sufficient pressure to produce the substantial lateral deflection of the falling veil as well as the cost of the control mechanism for alternately feeding the gaseous fluid to the opposed pairs of deflecting jets.

Yet another problem inherent in the use of gaseous deflecting jets is the substantial volume of the gaseous medium such as air or steam which is required to alternately deflect or lap the veils back and forth across the conveyor and the necessity for disposing of this volume of gases.

It is, therefore, the principal object of the instant invention to provide a method and apparatus for forming a fibrous blanket having substantial thickness from a number of descending veils of fine fibers by mechanically lapping these veils back and forth in a direction transverse to the direction of movement of the conveyor upon which they are being accumulated.

It is yet another object of the instant invention to provide a method and apparatus for mechanically guiding a falling, lightweight hollow veil of fine glass fibers back and forth in shingled layers upon an accumulating conveyor so as to gradually build up a substantially uniform, thick mass or blanket of fibers thereon.

These and other and more specific objects and advantages of a method and an apparatus embodying the invention will be better understood from the specification which follows and from the drawings in which.

Figure 1:
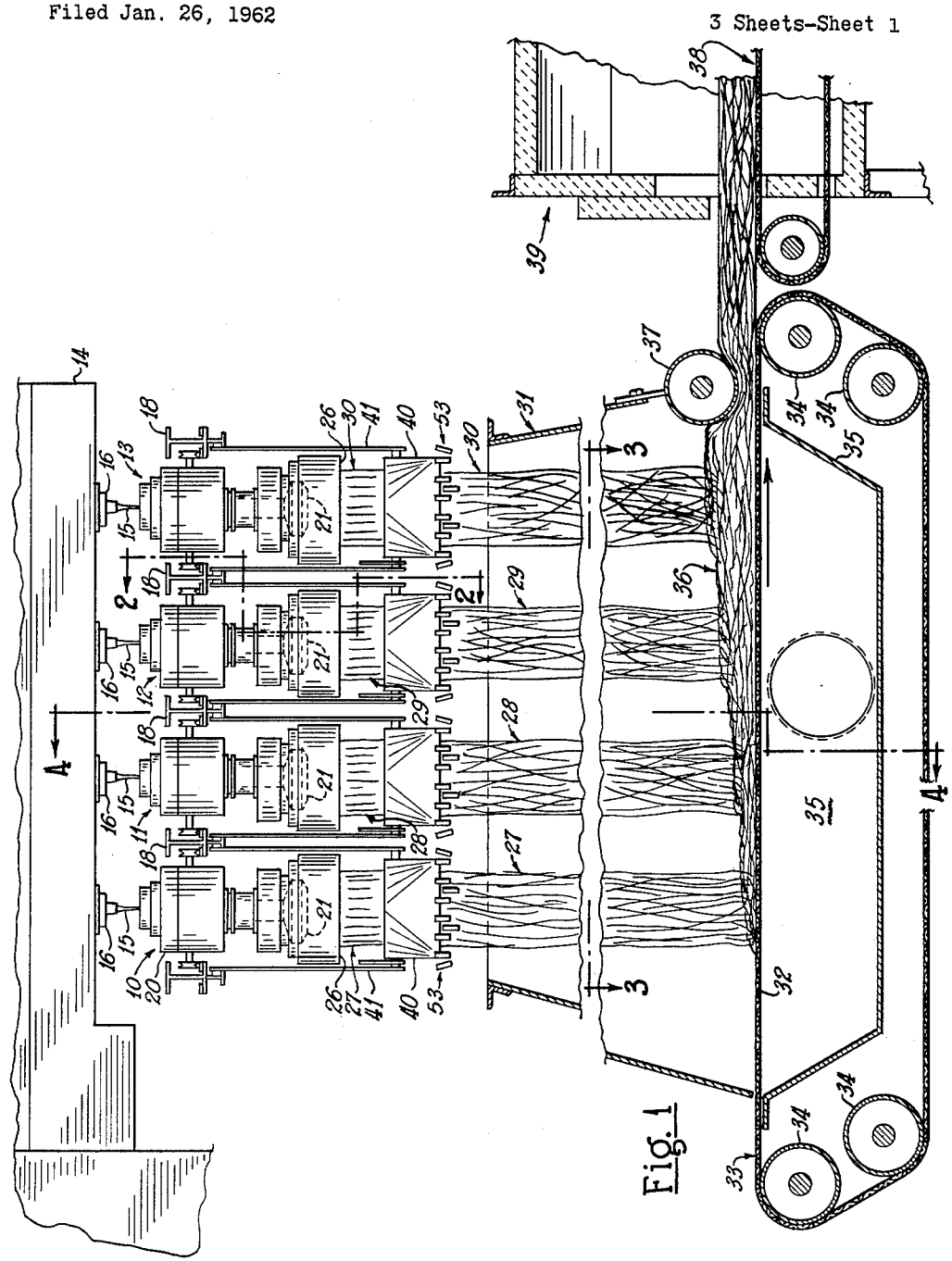
FIG. 1 is a fragmentary view, partly in elevation and partly in vertical section, showing a commercial apparatus for the production of a fibrous blanket according to the invention.

The method and apparatus for forming a fibrous blanket according to the invention will be described in connection with its use for the formation of a fibrous blanket of fine glass fibers produced from one or more rotary fiber forming apparatuses, there being shown four of such apparatuses 10, 11, 12 and 13 in FIG. 1. A supply of molten glass for the apparatuses 10–13 inclusive is provided by a fore-hearth generally indicated at 14, or similar apparatus, and an individual supply stream 15 for each of the rotary fibers forming apparatuses 10–13 is flowed through a suitable busing or orifice 16. Each of the apparatuses 10–13, inclusive (see also FIG. 2), has a carriage generally indicated at 17 which rides upon a pair of parallel rails 18. Each of the carriages 17 supports its respective apparatus, for example the apparatus 12 shown in FIG. 2, and each of the apparatuses 10–13 comprises a number of cooperating structures and elements which will be described with respect to only one of such apparatuses, such as the apparatus 12 shown in FIG. 2. Each of the rotary fiber forming apparatuses has a rotary hollow quill 19 suitably journaled in a main housing 20 and rotated at high speed by a motor not shown) enclosed within the housing 20. At the lower end of the quill 19 there is mounted a centrifuge generally indicated at 21 into which the supply stream of glass 15 falls after passing through the hollow interior of the quill 19. Suitable mechanism in the interior of the centrifuge 21 (not shown) distributes the glass from the supply stream 15 outwardly to the peripheral wall of the centrifuge 21 through which there are formed a plurality of stream forming orifices 22.

Mounted circumjacently to the quill 19 and its housing and also supported from the carriage 17 there is an annular burner generally indicated at 23 which plays its flames downwardly over the face of the centrifuge 21. In the illustrated rotary fiber forming apparatus there is also a second outer annular burner generally indicated at 24 which is utilized for adding heat to the system. An annular blower generally indicated at 25 is located circumjacent the centrifuge 21 and spaced at some distance from its periphery and a circular shield 26 is supported by the housing for the burners 23 and 24 by the blower 25.

As is more fully explained in U.S. Patent No. 2,949,-632 referred to above, the molten glass in the supply stream 15 is spread over the inner face of the periphery of the centrifuge 21 and then projected outwardly through the orifices 22 by centrifugal force in the form of relatively heavy "primaries" of glass which enter the downwardly directed blast of gases emitted from the blower 25 and, by the force of those gases, are attenuated out to form fine fibers and are drawn downwardly by the combination of the force of the blast and gravity in the form of a hollow tubular veil of fibers generally indicated at 27, 28, 29 or 30, respectively.

In FIG. 1 four of the rotary fiber forming apparatuses 10–13 inclusive are shown as being lined up above the open upper end of a vertically extending hood 31 (see also FIG. 4) which overlies an upper span 32 of a foraminous conveyor generally indicated at 33. The conveyor 33 travels around a plurality of guide rollers 34 and is driven in the direction indicated by the arrow in FIG. 1 so that it moves along beneath the lower end of the hood 31 for the reception and accumulation of a fibrous blanket thereon. A suction box 35 extends beneath the upper span 32 of the conveyor 33 in order to carry away the gases of the blasts emitted from the blowers 25. As can best be seen in FIG. 1, the conveyor 33 carries an accumulating blanket generally indicated at 36 out of the hood 31, for example, beneath a compaction roller 37 and onto a furnace conveyor 38 of a furnace generally indicated at 39.

Blankets of fibrous glass such as the blanket 36 illustrated in FIG. 1 are produced for commercial use in varying thicknesses and in varying apparent densities, this being the number of pounds of weight per cubic foot of the finished blanket or densified "board" produced from the blanket. For examples, loose, slightly compressed blankets of fibrous glass fabricated according to the invention, may be produced with apparent densities as low as .5 pound per cubic foot and densified "boards" with apparent densities as high as, say, 12 pounds or more, per cubic foot. The apparent density of any blanket or of any further compressed "board" of fibrous glass produced in this fashion, is determined by the correlation of a number of factors. These factors include, of course, the rate of production of the fibrous veils 27–30, inclusive, and the number of apparatuses 10–13, inclusive, producing such veils which are arranged in a single manufacturing apparatus as well as the speed of linear movement of the conveyor 33 by which the glass fibers are carried out of the forming hood 31. In order to achieve either thicker blankets of low density or blankets or "boards" of higher apparent density, it is necessary to accumulate larger quantities of blown fibers upon the lineal increments of length of the conveyor 33. As mentioned, the maximum production from each apparatus such as the individual apparatus 10–13, is limited by size and operating characteristics including not only the maximum size of the centrifuge 21 which can safely be rotated, but also the maximum volume of gas for energizing the burners 23 and 24 and the volume of gaseous medium which can be fed to the blower 25 for forming the attenuating blast—all of these considerations being limited by reasonable economic and operating features. Similarly, the number of individual apparatus 10–13 which can be arranged in a single manufacturing facility is also limited by considerations of space, supply of heating gas and gaseous attenuating medium, etc.

Because of the necessity for accumulating larger quantities of fibers upon the assembly conveyor 33 in order to achieve either thicker blankets 36, or "boards" produced therefrom and having higher apparent densities, it has been suggested in the above mentioned U.S. Patent No. 2,863,493 to Snow et al., that the individual veils 27 to 30 be "lapped" or traversed back and forth across the accumulating conveyor 33 to build them up upon the conveyor in a shingled assembly.

According to the present invention, the veils of fibers 27–30 are also lapped back and forth across the conveyor 33 as they descend from their respective forming apparatuses and in order to build up the blanket 36. Mechanism for lapping the individual veils 27–30 is illustrated in the drawings and comprising, among other parts, an individual guide chute 40 for each of the veils 27–30. Each of the apparatuses 10–13, inclusive, has a pair of spaced side plates 41, each pair of the side plates 41 pivotally supporting its respective guide chute 40. The guide chute 40 is illustrated as being a slightly conical tubular structure co-axially mounted with respect to the centrifuge 21 and spaced below the related shield 26 a distance such that the veil 29 enters its larger open upper end 42. Each of the guide chutes 40 is pivotally mounted by a pair of pivot pins 43 in its respective pair of support plates 41 and each has an arm 44 which extends upwardly from one side. Each of the arms 44 is connected by a link 45 and a second link 46 to a stroke adjustment bell crank 47 which is in turn pivoted on a support strut 48. The stroke adjustment bell crank 47 is connected by a tie rod 49 to a cam crank 50 that is engaged with a cam 51 driven by suitable mechanism. Rotation of the cam 51 causes rocking of the bell cranks 50 and 47 and oscillatory movement of the guide chute 40 between the position shown in solid lines in FIG. 4 and the position indicated by the reference number 40a and shown in broken lines in FIG. 4.

Figures 3, 4:
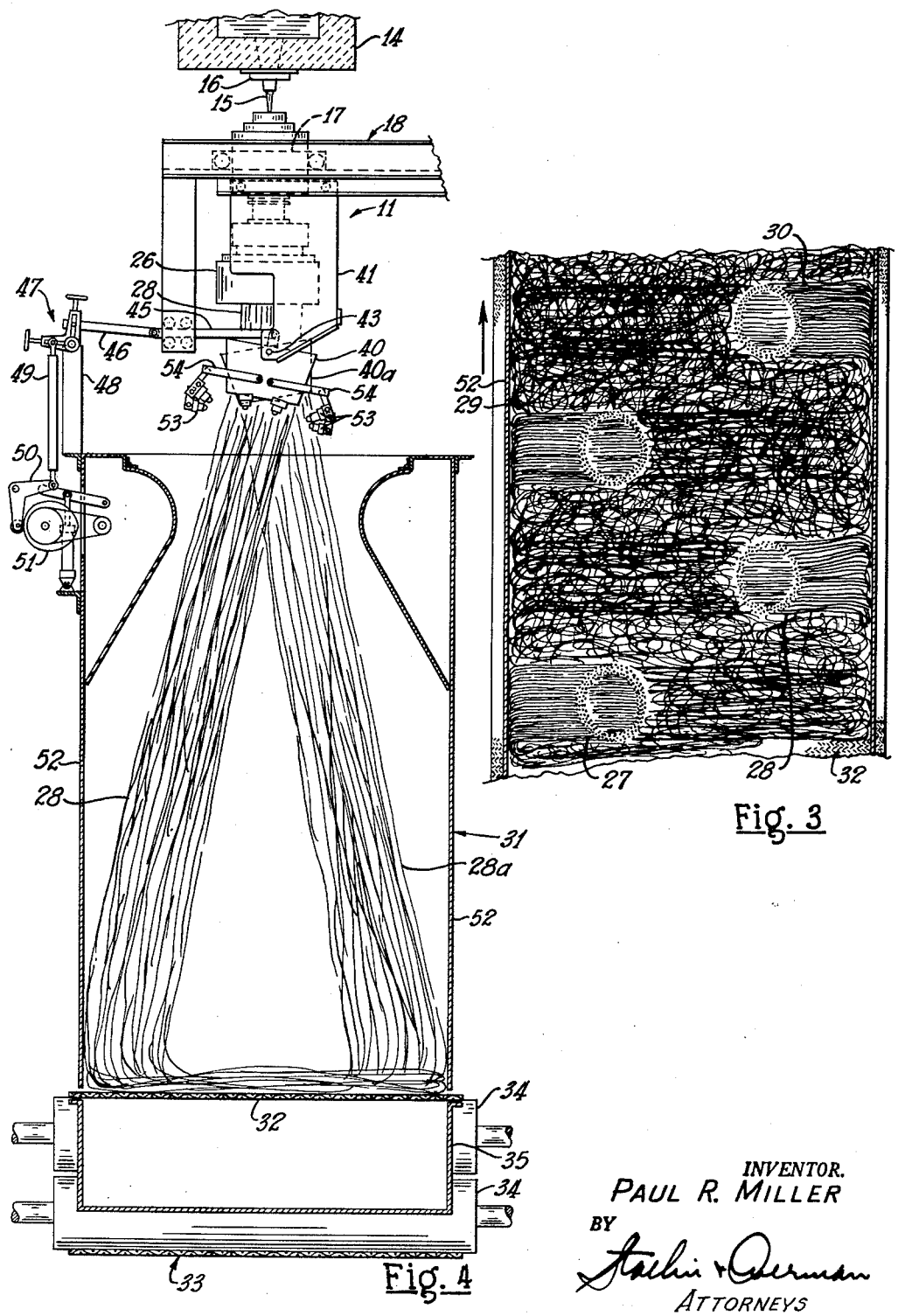
FIG. 3 is a fragmentary horizontal view taken from the position indicated by the line 3—3 of FIG. 1.
FIG. 4 is a fragmentary vertical sectional view, with some parts shown in elevation, taken along the line 4—4 of FIG. 1 and shown on a slightly enlarged scale.

Oscillatory movement of the guide chute 40 "laps" the respective one of the veils 28–30, for example the veil 28 of FIG. 4, back and forth across the width of the conveyor 33 between side walls 52 of the hood 31, the veil 28 being indicated by the reference number 28 at one side of the hood 31 and the reference number 28a at the other side of the hood 31. Where a plurality of apparatuses such as the rotary fiber forming apparatuses 10–13 are employed in unison to provide a supply of fine fibers, it has been found desirable to so arrange the mechanisms for oscillating the respective chutes 40 as to produce out-of-phase movement between adjacent chutes 40 and, consequently, out-of-phase traversing of the conveyor span 32 by the respective ones of the veils 27, 28, 29 and 30, this relationship being illustrated in FIG. 3 of the drawings where the two veils 27 and 29 and shown as returning from left to right and to two veils 30 and 28 are illustrated as returning from right to left.

Figure 2:
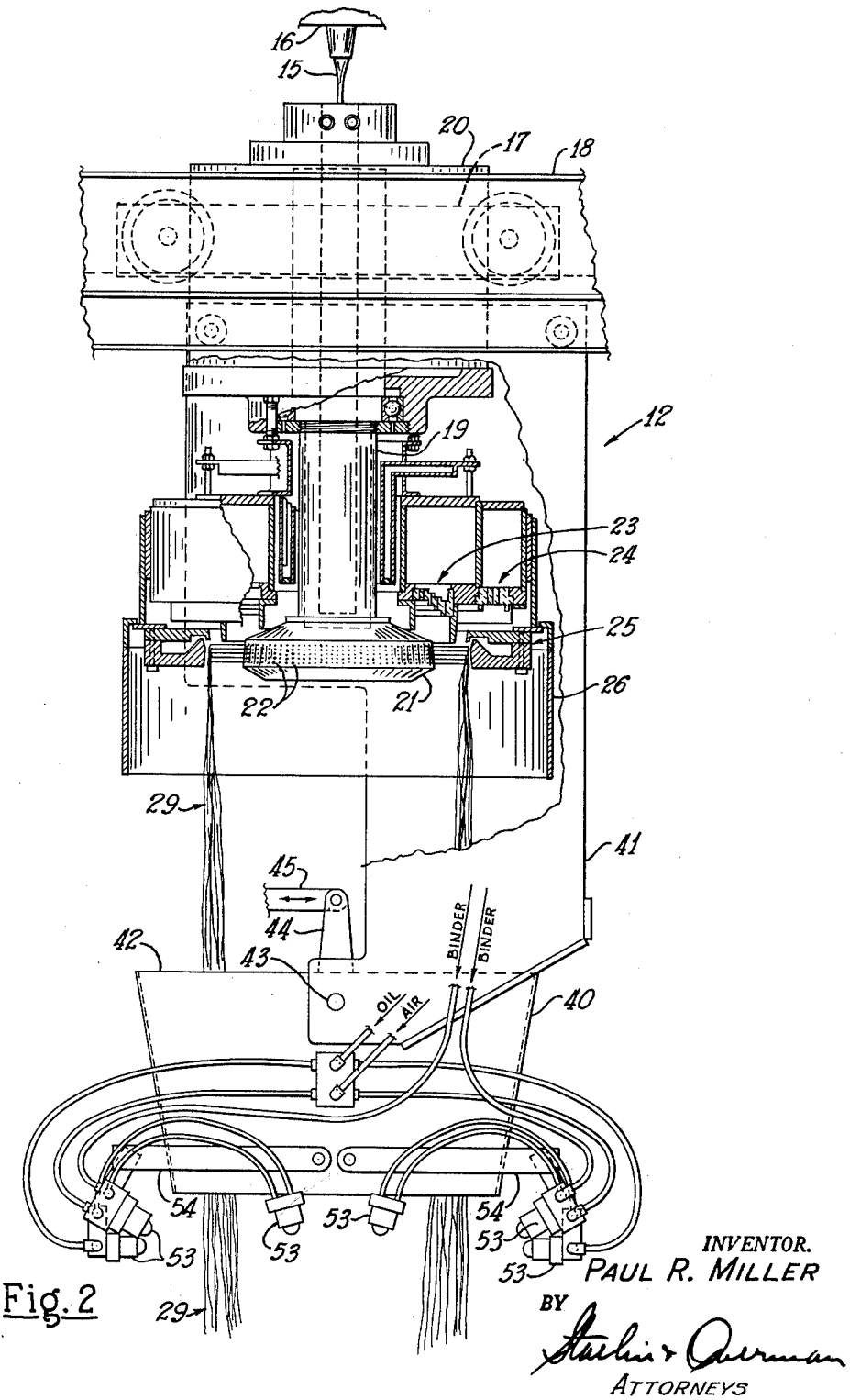
FIG. 2 is a fragmentary view, partly in section, taken along the line 2—2 of FIG. 1 and shown on an enlarged scale.

In order to control the degree of densification or the finished thickness of the blanket of fibers after accumulation upon the conveyor span 32 and passage from the hood 31, each of the individual veils 28–30, inclusive, is supplied with a calculated proportion of synthetic resinous or other material frequently referred to as a "binder" which material is spread throughout the veil, for example, the veil 29 illustrated in FIG. 2. This "binder" as well as other treating materials such as, for example, mineral oils or other lubricants and also air for aiding in the distribution of the materials throughout the fibers of the veil 29 are supplied from suitable guns generally indicated at 53 in FIG. 2 and shown as being mounted upon support brackets 54 carried by the respective one of the guide chutes 40. Such materials, including the binder, are carried into the furnace 39 along with the blanket 36 and are set-up during the passage of the blanket 36 through the furnace 39 either at the thickness and density at which it enters the furnace 39 or in a thinner or more greatly densified condition depending upon whether or not the furnace 39 is provided with additional compaction or densification rollers or conveyors.

It has been found that the method and apparatus for forming a fibrous blanket according to the invention produces a more nearly uniform fibrous blanket of "shingled" and "lapped" veils both by reason of the positive displacement of the veils 27–30, inclusive, and the elimination of the excessive quantities of gaseous medium, for example, steam which has to be condensed and removed from the hood 31 and which causes great turbulence within the hood 31 and resulting disarrangement in the smooth flow of the descending veils 27–30.

What is claimed is:

1. In an apparatus for producing a fibrous blanket of lapped layers of glass fibers, said apparatus consisting of a plurality of fiber forming apparatuses each comprising means for providing a high velocity, downwardly moving, tubular blast of gas and means for feeding molten glass thereinto for producing a continuous, downwardly moving, tubular veil of fine fibers entrained in said blast, said apparatuses being arranged in a longitudinally extending row, an open ended vertically extending hood erected beneath said fiber forming apparatuses and having a lower end wider than its upper end, an accumulating conveyor having a width equal to the width of the lower end of said enclosure and being mounted for lineal movement across the lower end of said enclosure longitudinally thereof and means for moving said conveyor at a controlled lineal speed, the improvement comprising, open ended tubular guide for each of said fiber forming apparatuses, each of said guides having an upper end broad enough to accept the veil of fibers produced by its associated fiber forming apparatus and an open lower end being mounted for oscillatory movement on a horizontal pivot line extending parallel to the direction of movement of said conveyor, and mechanism for oscillating each of said guides in controlled frequency and amplitude for lapping said veils back and forth on said conveyor in shingled layers as said conveyor moves across beneath said guides.

2. In an apparatus according to claim 1, the improvement comprising a plurality of devices for applying fiber treating material to the fibers in said veil, said devices being mounted upon said tubular guide adjacent the lower end thereof and oscillatable therewith.

References Cited in the file of this patent

UNITED STATES PATENTS

| 2,653,416 | Slayter | Sept. 29, 1953 |
| 2,863,493 | Snow et al. | Dec. 9, 1958 |
| 2,927,621 | Slayter et al. | Mar. 8, 1960 |
| 3,041,817 | Fehrer | July 3, 1962 |

FOREIGN PATENTS

| 136,007 | Great Britain | Dec. 11, 1919 |